United States Patent [19]
Greene

[11] Patent Number: 5,419,117
[45] Date of Patent: May 30, 1995

[54] TURBO JET/RAM JET PROPULSION SYSTEM

[75] Inventor: Leonard M. Greene, Scarsdale, N.Y.

[73] Assignee: The Boeing Company, Seattle, Wash.

[21] Appl. No.: 99,427

[22] Filed: Jul. 30, 1993

[51] Int. Cl.$^6$ .............................................. F02K 7/16
[52] U.S. Cl. ...................................... 60/224; 60/244; 60/262
[58] Field of Search ............. 60/224, 225, 262, 39.23, 60/264; 137/15.1

[56] References Cited

U.S. PATENT DOCUMENTS

| | | | |
|---|---|---|---|
| 2,944,764 | 7/1960 | Lane et al. | |
| 3,032,977 | 5/1962 | Neitzel | 60/39.23 |
| 3,077,735 | 2/1963 | Johnson et al. | 137/15.1 |
| 3,374,631 | 3/1968 | Marks | 60/244 |
| 3,387,457 | 6/1968 | Garraway | 60/224 |
| 3,447,325 | 6/1969 | Tiley | 60/224 |
| 5,058,377 | 10/1991 | Wildner | |
| 5,165,227 | 11/1992 | Grieb | 60/262 |
| 5,216,878 | 6/1993 | Klees | 60/262 |

OTHER PUBLICATIONS

Treager, Irwin E. *Aircraft Gas Turbine Engine Technology* McGraw-Hill, N.Y., 1970. p. 59.

*Primary Examiner*—Louis J. Casaregola
*Attorney, Agent, or Firm*—James P. Hamley

[57] ABSTRACT

An integral turbo jet/ram jet propulsion system has co-axial forward and rear portions and includes a converging supersonic compression chamber and an inlet in the forward portion for directing air into the supersonic compression chamber. A diverging subsonic compression chamber is disposed rearwardly of the supersonic compression chamber. An inlet sonic throat connects the supersonic compression chamber and the subsonic compression chamber and directs a flow of air from the supersonic compression chamber through the throat and into the subsonic compression chamber. A high by-pass turbo jet engine is disposed adjacent to the subsonic compression chamber for heating and expanding the air which passes into the engine. A subsonic expansion exhaust chamber and supersonic expansion exhaust chamber are disposed rearwardly of the engine with an exhaust sonic throat between the two. The exhaust sonic throat connects the subsonic expansion chamber an the supersonic expansion chamber and directs the air from the engine and the subsonic expansion chamber into and through the supersonic expansion chamber. A throttle member is disposed in each of the throats for increasing and decreasing the amount of compression and expansion as the flow of air passes through each of the throats to an exhaust outlet. The heated expanded air maintains a higher velocity and pressure in and against the supersonic expansion chamber than in the supersonic compression chamber to thereby produce a ram jet effect.

6 Claims, 1 Drawing Sheet

TURBO JET/RAM JET PROPULSION SYSTEM

FIELD OF THE INVENTION

This invention relates to a turbo jet/ram jet engine or propulsion system and more particularly to a turbo jet/ram jet system which uses the waste heat of the turbo jet engine to produce ram jet thrust.

BACKGROUND FOR THE INVENTION

Turbo jet and ram jet engines have been combined in aircraft which are designed for supersonic flight. For example, the U.S. Pat. No. 2,944,764 of Lane et al. discloses an aircraft with a plurality of engines wherein the engines are partly turbo jet engines and partly simple combustors forming a ram jet system. A more recent U.S. Pat. No. 5,058,377 of Wildner discloses a turboramjet engine. As disclosed by Wildner, a turboramjet engine is provided with a ram pressure air duct shrouding the basic turbo jet engine in an annular manner. When the ram jet operation is disconnected, the ram pressure air duct, while at the same time intake air is released into the basic engine, is blocked off with respect to the supply of ram pressure air. A ring slide is provided which is axially adjustable to always be opposite a body which blocks the ram pressure air duct when the inflow cross-section of the basic engine is unblocked and unblocks it when the inflow cross-section is blocked.

A turbo jet/ram jet propulsion system in accordance with the present invention provides improved performance by efficiently using the waste heat from the turbo jet engine to produce ram jet thrust. This efficiency is achieved by the total integration of the turbo jet and ram jet principles into the flow design which will be described hereinafter.

BRIEF SUMMARY OF THE INVENTION

The present invention contemplates an integral turbo jet/ram jet propulsion system having co-axial forward and rear portions. The system includes a converging supersonic compression chamber and an inlet disposed in the forward portion of the system for directing a flow of air into the supersonic compression chamber. A diverging subsonic compression chamber is disposed rearwardly of the supersonic compression chamber and throat means are provided for connecting the supersonic compression chamber and the subsonic compression chamber. The throat means also directs the flow of air from the supersonic compression chamber through the throat means and into the subsonic compression chamber. The system also includes a turbo jet engine disposed rearwardly of the subsonic compression chamber for heating and compressing the flow of air which passes into and through the engine. A subsonic expansion exhaust chamber and supersonic expansion exhaust chamber are disposed rearwardly of the engine with an exhaust sonic throat means between the two. The exhaust sonic throat means connects the subsonic expansion chamber and the supersonic expansion chamber and directs the flow of air from the engine and the subsonic expansion chamber into and through the supersonic expansion chamber. The system also includes throttle means disposed in each of the throat means for increasing and decreasing the amount of compression and expansion as the flow of air passes through each of the throat means and an outlet. The heated expanded air maintains a higher velocity and pressure in and against the supersonic expansion chamber than in the supersonic compression chamber to thereby produce both a turbine thrust and ram jet thrust from the turbine-heated air.

DETAILED DESCRIPTION OF A PREFERRED EMBODIMENT OF THE INVENTION

Figure 1:
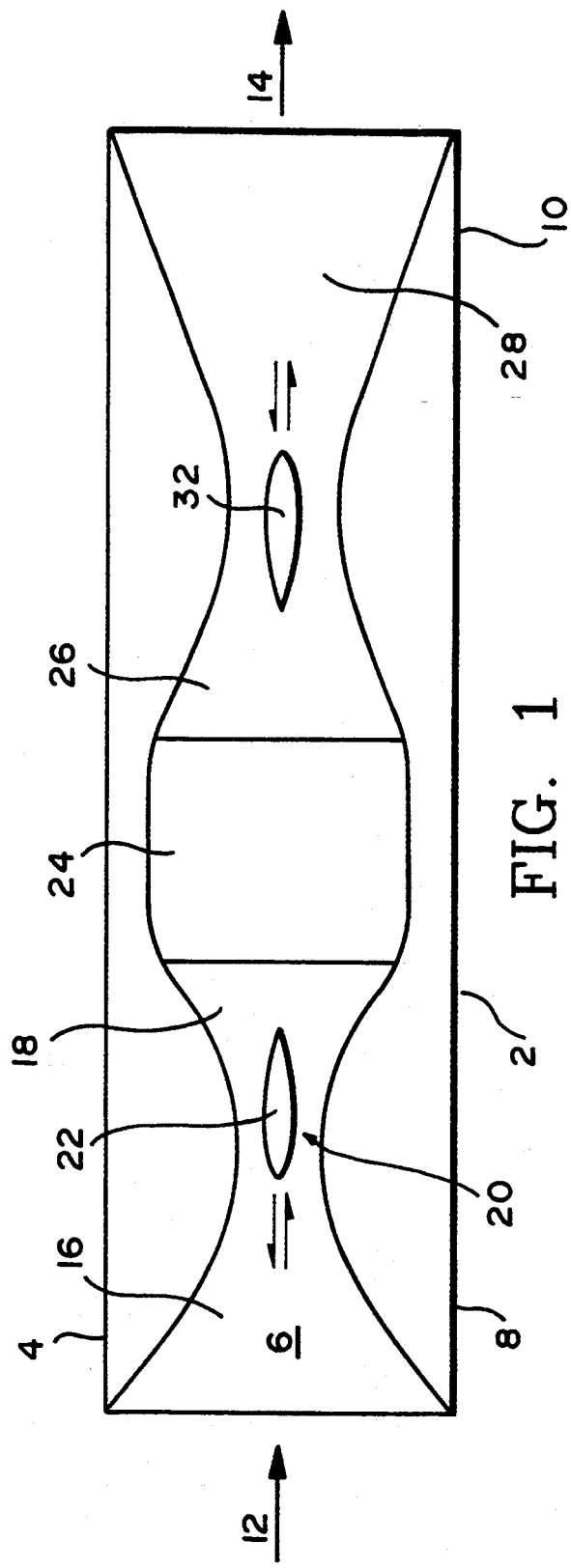
FIG. 1 is a schematic illustration of a turbo jet/ram jet propulsion system in accordance with a preferred embodiment of the invention; and, FIG. 2 is a schematic diagram which illustrates the pressure increase and decrease along the longitudinal axis of the propulsion system shown in FIG. 1.

The invention will now be described in connection with the accompanying drawings. As illustrated in FIG. 1, a turbo jet/ram jet propulsion system 2 includes an annular shaped outer housing 4 which may have a circular or other cross section and a longitudinally extending passageway 6 which extends through the center of the housing 4. The system 2 also includes a forward or compression portion 8 and a rear or exhaust portion 10, an inlet 12 and exhaust opening 14. The inlet 12 is disposed at the forward part of the system 2 and has a cross section which is preferably about equal to the exterior cross-section of the housing 4. The exhaust opening 14 is disposed at the rear of the exhaust portion 10 and has a diameter which is preferably about equal to the diameter of inlet 12.

The passageway 6 in the forward portion 8 defines a supersonic compression chamber 16 which has a decreasing cross-sectional area as the passageway progresses from the inlet 12 toward the rear portion 10. As shown in FIG. 1, the passageway 6 also defines a subsonic compression chamber 18 which is disposed rearwardly of the supersonic compression chamber 16 and connected thereto by an inlet sonic throat 20. The subsonic compression chamber 18 has an increasing cross-sectional diameter which increases along the longitudinal axis of the system in the direction from the forward portion 8 toward the rear portion 10. A throttle member 22 which preferably defines a cylindrical body having tapered forward and rear portions is disposed in the throat 20 and is movable forwardly and rearwardly along the longitudinal axis to increase or decrease the compression of the air flowing through the system 2. The throttle member 22 may define a generally ellipsoidal shape as shown in FIG. 1.

A turbo jet engine 24 is disposed rearwardly of the subsonic compression chamber and is adapted to receive all of the air flow from the subsonic compression chamber 18. The turbo jet engine has a diameter which is less than the diameter of inlet 12 heats the air passing therethrough and exhausts that air into a subsonic expansion chamber 26. The subsonic expansion chamber 26 defines a constricting structure in which the cross sectional area decreases as the air moves away from the turbo jet engine. A supersonic expansion chamber 28 is connected to the sub sonic expansion chamber 26 by an exhaust sonic throat 30 so that the flow of air passes from the high by pass turbo jet engine 24 through the subsonic expansion chamber 26, through the exhaust sonic throat 30 and into the supersonic expansion chamber 28.

Figure 2:
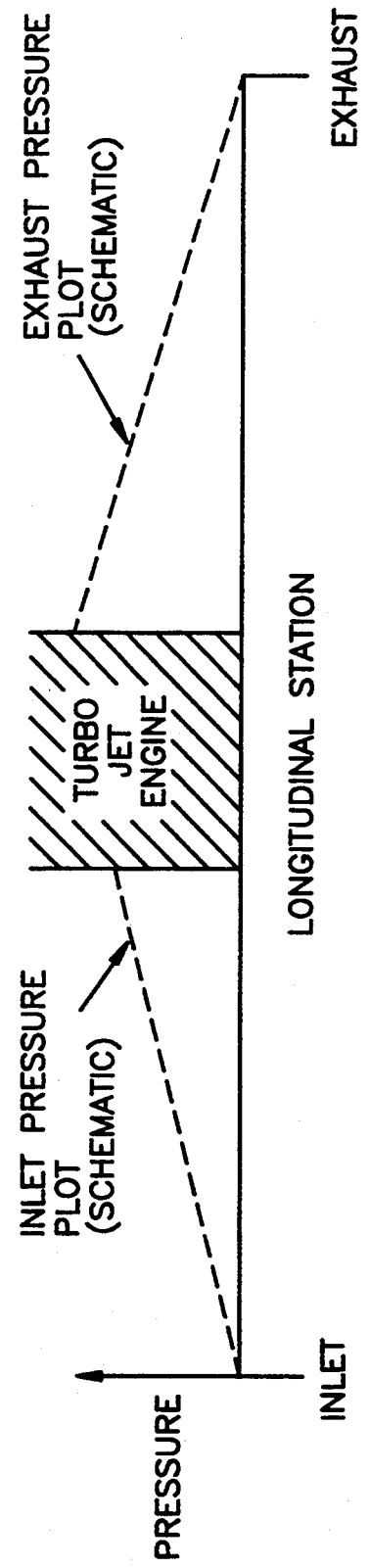

The improvement of the turbo jet/ram jet engine in accordance with the present invention is due to the efficient use of the waste heat of the turbo jet to produce ram jet thrust. This efficiency is achieved by the total integration of the turbo jet and ram jet principles in the flow design. For example, as illustrated in FIG. 2, the average duct pressures forward of the engine are lower than the average duct pressures to the rear of the engine. The reason for this is because of the pressure increase of the air passing through the engine combined with the expansion of that air because of heat. This heat expanded air maintains a higher velocity and pressure against the walls of the exhaust nozzle to thereby produce a ram jet effect.

In a propulsion system in accordance with a preferred embodiment of the invention, the maximum divergence of the supersonic compression chamber 28 is at the inlet 12. The diameter measured at inlet 12 is greater than the diameter of the subsonic compression chamber 18 at its point of maximum divergence i.e. at the entrance or intake of the turbo jet engine 24.

In the preferred embodiment of the invention, the supersonic expansion chamber 28 has a diameter at its maximum point of divergence i.e. at exhaust opening 14 greater than the diameter of the subsonic expansion chamber 26 at its maximum point of divergence i.e. at the exhaust of the turbo jet engine 24.

In the operation of a propulsion system in accordance with the present invention, the ram jet thrust becomes more important as the operational reach number increases well beyond the speed of sound. It should also be recognized that the flow of air into the inlet 12 is most efficient when the inlet velocity to flight speed is near unity. Otherwise the air will be deflected to the outside of the inlet causing a heavy shock wave. It should also be recognized that the system differs from a conventional jet with an afterburner since additional fuel is not added and because there is no additional ignition beyond that which occurs in the turbo jet engine.

The throttle member 22 may be adjusted by movement along the longitudinal axis of the propulsion system 2. For example, the throttle member 22 may be moved into the inlet sonic throat 20 toward the inlet 12 to obtain maximum compression with out inlet entrance spillage. The speed of sound will always be obtained at the maximum throttle constriction of the duct. Thereafter, the inlet air further compresses subsonically in an enlarging duct i.e. the subsonic compression chamber 18 and into the high by pass turbo fan jet engine 24. The high bypass is desirable so that the turbine engine can handle all of the air admitted by the inlet 12 without entrance spillage. The engine 24 also acts as a pressure wall between the inlet portion and exhaust portion of the system 2.

The air exhausting from the turbo jet engine 24 will have a rise in temperature imparted by the turbine burner. As the air leaves the turbo fan engine 24, it expands in a constricting duct i.e. subsonic exhaust expansion chamber 26 until it reaches its sonic speed (which is dependent upon its temperature) at the exhaust sonic throat 30. The cross sectional area of the exhaust sonic throat 30 is controlled by an exhaust throttle 32 which is movable along the axis of the propulsion system 2 by any suitable means which will be well understood by a person of ordinary skill in the art.

The exhaust throttle 32 may also be defined as a generally ellipsoidal shaped member. The exhaust air thereafter further expands in an exhaust nozzle i.e. the supersonic expansion chamber 28 and out through the exhaust opening 14.

What is claimed is:

1. An integral turbo jet/ram jet propulsion system having forward and rear portions comprising a converging supersonic compression chamber and an inlet disposed in said forward portion of said system for directing a flow of air into said supersonic compression chamber, a diverging subsonic compression chamber disposed rearwardly of said supersonic compression chamber and throat means connecting said supersonic compression chamber and said subsonic compression chamber and for causing the flow of air from said supersonic compression chamber to flow through said throat means and into said subsonic compression chamber, a turbo jet engine disposed rearwardly of said subsonic compression chamber for heating and expanding all of the air which passes through said subsonic compression chamber and into and through said engine, a subsonic expansion exhaust chamber, a supersonic expansion exhaust chamber and an exhaust sonic throat means connecting said subsonic expansion chamber and said supersonic expansion chamber and for directing the flow of air from said engine and said subsonic expansion chamber into and through said supersonic expansion chamber, an exhaust outlet and first and second throttle means disposed in each of said throat means for increasing and decreasing the amount of compression and expansion as the flow of air passes through each of said throat means whereby the heated expanded air maintains a higher velocity and pressure in and against said supersonic expansion chamber than in said supersonic compression chamber to thereby produce a ram jet effect.

2. An integral turbo jet/ram jet propulsion system in accordance with claim 1 in which includes an outer housing having a generally annular cross section.

3. An integral turbo jet/ram jet propulsion system in accordance with claim 1 in which said first throttle means comprises a cylindrical body having generally tapered forward and rear portions.

4. An integral turbo jet/ram jet propulsion system in accordance with claim 3 in which said second throttle means is a generally ellipsoidal body.

5. An integral turbo jet/ram jet propulsion system in accordance with claim 1 in which said supersonic expansion chamber has a diameter at its maximum point of divergence which is greater than the diameter of said subsonic expansion chamber at its maximum point of divergence.

6. An integral turbo jet/ram jet propulsion system in accordance with claim 5 in which the diameter of said supersonic compression chamber at its maximum point of divergence is equal to the diameter of said supersonic expansion chamber at its maximum point of divergence and in which the diameter of said subsonic compression chamber at its maximum point of divergence is equal to the diameter of said subsonic expansion chamber at its maximum point of divergence.

* * * * *